(12) United States Patent
Miller et al.

(10) Patent No.: US 7,519,099 B2
(45) Date of Patent: Apr. 14, 2009

(54) PSEUDORANDOM NOISE LOCK DETECTOR

(75) Inventors: Timothy R. Miller, Arlington, VA (US); Paul R. Runkle, Durham, NC (US)

(73) Assignee: Freescale Semiconductor, Inc., Austin, TX (US)

( * ) Notice: Subject to any disclaimer, the term of this patent is extended or adjusted under 35 U.S.C. 154(b) by 658 days.

(21) Appl. No.: 11/238,990

(22) Filed: Sep. 30, 2005

(65) Prior Publication Data
US 2007/0076787 A1    Apr. 5, 2007

(51) Int. Cl.
*H04B 1/00* (2006.01)
(52) U.S. Cl. ...................................... 375/130; 375/367
(58) Field of Classification Search ................. 375/130, 375/140, 141, 144, 146–18, 150, 367
See application file for complete search history.

(56) References Cited
U.S. PATENT DOCUMENTS

| | | | | |
|---|---|---|---|---|
| 4,317,204 A * | 2/1982 | Gordy et al. | ................. | 375/150 |
| 5,469,470 A * | 11/1995 | Takahashi | ................... | 375/142 |
| 5,598,154 A * | 1/1997 | Wilson et al. | ................. | 341/50 |
| 5,832,025 A * | 11/1998 | Yamamoto | ................... | 375/148 |
| 5,953,364 A * | 9/1999 | Yamamoto | ................... | 375/147 |
| 6,184,826 B1 * | 2/2001 | Walley et al. | ............... | 342/360 |
| 6,384,780 B2 * | 5/2002 | Walley et al. | ............... | 342/360 |
| 6,507,571 B1 * | 1/2003 | Yamamoto | ................... | 370/335 |
| 7,190,711 B2 * | 3/2007 | Keller et al. | ................. | 375/150 |
| 2004/0047401 A1 * | 3/2004 | Keller et al. | ................. | 375/147 |
| 2005/0254558 A1 * | 11/2005 | Dutka | ........................ | 375/149 |

* cited by examiner

*Primary Examiner*—Jean B Corrielus

(57) ABSTRACT

A device for detecting data synchronization in data communications includes pseudorandom noise (PN) lock circuits (101, 113, 127). The PN lock circuits (101, 113, 127) receive an input data stream (109). Each of the PN lock circuits (101, 113, 127) is time offset with respect to the other PN lock circuits. Each of the PN lock circuits (101, 113, 127) outputs a PN sequence responsive to the input data stream. For each PN lock circuit, there is provided a component (105, 117, 131) for comparing the PN sequence from the respective PN lock circuit to the input data stream, to determine whether the input data stream and the PN sequence are synchronized. An indication (107, 119, 133) that the data is synchronized is provided when the input data stream and the PN sequence are synchronized.

19 Claims, 5 Drawing Sheets

PSEUDORANDOM NOISE LOCK DETECTOR

FIELD OF THE INVENTION

The present invention relates in general to communication units and communication networks, and more specifically to data synchronization.

BACKGROUND OF THE INVENTION

A data communication which is to be received by a device can be preceded by a pseudorandom noise (PN) sequence in a message. The PN sequence is included typically in a preamble of a frame, prior to the data payload included in the message.

To recover the transmitted message, a receiver must be synchronized to the received signal. Synchronization can be detected by checking the received PN sequence against a locally generated PN sequence.

If the received PN sequence in the data communication sufficiently checks against the locally generated PN sequence, then the receiver can assume that it is synchronized to the transmitter and can proceed to receive the rest of the data communication. Many existing protocols utilize a few well known and well understood generator polynomials in the PN sequences.

For proper operation, a locally generated PN sequence should be synchronized to the PN sequence of the transmitted signal. Knowledge of the data within the transmitted PN sequence allows the receiver to better train signal processing components that aid in the reception of the data message within the frame. Examples of such signal processing components are a decision feedback equalizer (DFE), a rake, a linear equalizer, or similar device having an equalization block. Known data sequences, such as PN sequences, that are transmitted and use to train processing blocks are often referred to as training sequences.

An equalizer typically retrains on the PN sequence for each received packet. This can allow the flexibility for the equalizer to adapt. However, some conventional equalizers do not retrain for each packet.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

DETAILED DESCRIPTION

In overview, the present disclosure concerns wireless communications devices or units, often referred to as communication units, such as cellular phone or two-way radios and the like having operating capability to receive a message, such as associated with a communication system such as an Ultra Wide Band (UWB) network, Enterprise Network, a cellular Radio Access Network, or the like. Such communication systems may further provide services such as voice and data communications services. More particularly, various inventive concepts and principles are embodied in devices, communication units, and methods therein for detecting data synchronization associated with a received call at a communication unit.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software and/or integrated circuits (ICs), such as a digital signal processor and software therefore, application specific ICs, or a combination thereof. It is expected that one of ordinary skill, notwithstanding possibly significant effort and many design choices motivated by, for example, available time, current technology, and economic considerations, when guided by the concepts and principles disclosed herein will be readily capable of generating such software instructions and/ or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

As further discussed herein below, various inventive principles and combinations thereof are advantageously employed to reduce the time for determining data synchronization in data communications using a pseudorandom noise (PN) sequence. One or more embodiments can be utilized in data communications, for example data communications having transmissions incorporating a PN sequence for data synchronization.

Further in accordance with exemplary embodiments, a device for detecting data synchronization in data communications includes one or more pseudorandom noise (PN) lock circuits. A PN lock circuit in the device can receive an input data stream that includes input PN sequence data. The PN lock circuit can output a PN sequence in response to the input PN sequence data. A compare component can be provided to compare the PN sequence from the PN lock circuit to the input PN sequence stream as it is received, to determine whether the input data stream and the PN sequence are synchronized. The comparison can be staged, in order to reduce time for determining synchronization. Also, the compare component can accommodate noise in the input data stream that may lead to bit decision errors. According to one or more embodiments, the PN lock circuit and/or the compare component can be provided in parallel, operating on time-shifted portions of the input data stream, to reduce time for determining synchronization. Therefore, one or more embodiments provides for detecting synchronization of a PN sequence in an input data stream, potentially where the data communications experience noise.

Figure 1:
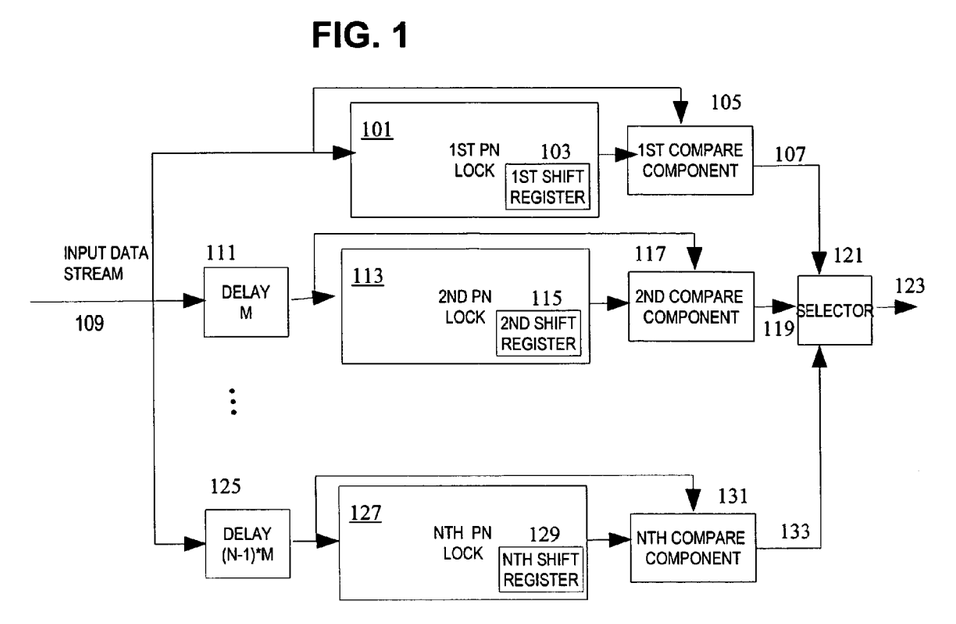
FIG. 1 is a block diagram illustrating detection of data synchronization in accordance with various exemplary embodiments.
Figures 5, 6:
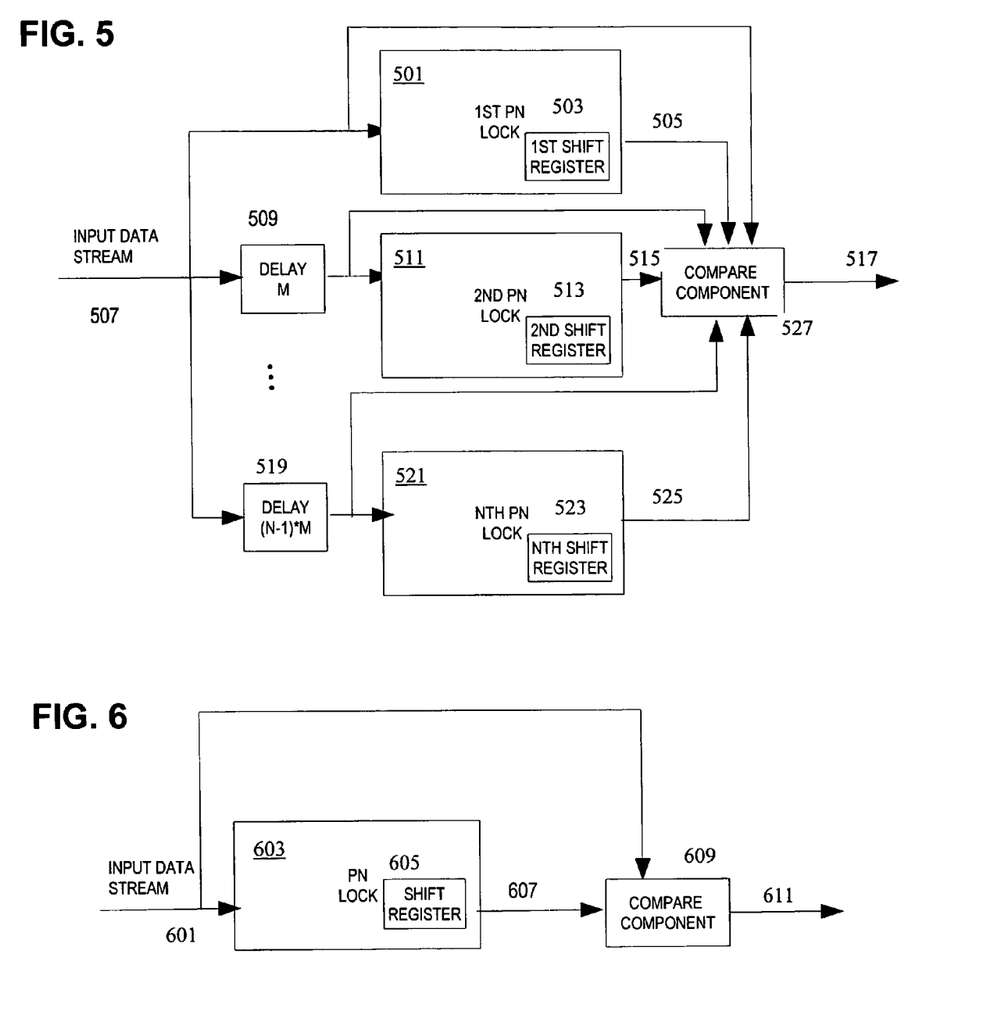
FIG. 5 is a block diagram illustrating detection of data synchronization in accordance with various alternate exemplary embodiments.
FIG. 6 is a block diagram illustrating detection of data synchronization in accordance with various other alternate exemplary embodiments.

FIG. 1, FIG. 5 and FIG. 6 describe three illustrative embodiments of a device for detecting data synchronization. In the exemplary embodiment of FIG. 1, two or more PN lock circuits are provided with respective compare components, in parallel. In the exemplary embodiment of FIG. 5, two or more PN lock circuits are provided in parallel, where the PN lock circuits share a compare component. In the exemplary embodiment of FIG. 6, a PN lock circuit and compare component are provided. Each of these exemplary embodiments is discussed in further detail below.

Referring now to FIG. 1, a block diagram illustrating detection of data synchronization in accordance with various exemplary embodiments will be discussed and described. An input data stream 109, such as obtained from a received transmission in a data communication, is provided. The input data stream 109 can be provided to various components, discussed below in more detail, which will determine whether a PN sequence in the input data is synchronized with a locally generated PN sequence. When the input data is synchronized with the locally generated PN sequence, an indication 123 that the data is synchronized can be provided.

In the illustrated example, the data synchronization detection device includes two or more PN lock circuits 101, 113, 127. The PN lock circuits 101, 113, 127 can be provided in parallel with respective compare components 105, 117, 131.

The illustrated PN lock circuits 101, 113, 127 include a register, here illustrated as a shift register 103, 115, 129, for generating a PN sequence. In the illustrated embodiment, the PN lock circuits include 1st PN lock 101; 2nd PN lock 113; and nth PN lock 127; the respective registers include 1st shift register 103, 2nd shift register 115, and nth shift register 129; and the respective compare components include 1st compare component 105, 2nd compare component 117, and nth compare component 131.

Different portions of the input data stream 109 can be provided to respective PN lock circuits 101, 113, 127. In the illustrated embodiment, the input data stream 109 is time shifted for the PN lock circuits 101, 113, 127 by including a delay 111, 125 for PN lock circuits 2-n. The illustrated delay can provide a time of delay of duration k*M, where M is a selected time period, and k is the number of PN lock-1. One of skill in the art will appreciate that different portions of the input data stream 109 can be delayed in other manners.

Accordingly, one or more embodiments provide that the plurality of PN lock circuits operate in parallel on time offset portions of the same input data stream, and the respective components operate on respective time offset portions of the same input data stream. In the illustrated embodiment, there are provide three PN lock circuits The PN lock circuits 101, 113, 127 can receive the respective portions of input PN sequence data in the input data stream. As described below in more detail in connection with FIG. 2, the PN lock circuits 101, 113, 127 can provide respective PN sequences in their corresponding registers, here illustrated as shift registers 103, 115, 129.

One or more embodiments can provide that the time offset corresponds to N/2, wherein the PN sequence is output by the respective PN lock circuit into a shift register, and where N is the number of bits of the shift register. N can be representative of the time for receiving 1 bit (or a multiple of bits), or a time for executing a certain number of instructions, or the like.

The respective compare components 105, 117, 131 can compare the PN sequences in the corresponding registers 103, 115, 129 to the input data stream 109. In the illustrated embodiment, the input data stream 109 is time shifted prior to the comparison. However, it will be appreciated that the input data stream 109 does not need to be shifted prior to the comparison. A more detailed description of an exemplary comparison is provided below in connection with FIG. 3. If and when the input data stream 109 agrees with the PN sequence, then the compare component 105, 117, 131 that detected the agreement can signal 107, 119, 133 the detection of agreement.

The signals 107, 119, 133 of the detection of agreement can be provided to a selector 121, which can determine which of the signals 107, 119, 133 indicated agreement, and can provide an indication 123 that the data is synchronized. For example, the selector 121 can select the first compare component 105, 117, 131 that indicated agreement, or the most recent. Also, the selector 121 can indicate which register contains the PN sequence that resulted in agreement.

The indication 123 that the data is synchronized can be utilized to indicate that an equalization block can be trained. This can be useful in, for example, a typical decision feedback equalizer (DFE), rake, linear equalizer, or the like. Considering the DFE as an example, a training block of a conventional DFE trains on the input data stream and the PN sequence in a well known manner.

Accordingly, one or more embodiments can provide a device for detecting data synchronization in data communications. The device can include a plurality of pseudorandom noise (PN) lock circuits, each of the PN lock circuits receiving an input data stream, each of the PN lock circuits being time offset with respect to the other PN lock circuits, and each of the PN lock circuits outputting a PN sequence responsive to the input data stream. Also, for each PN lock circuit, there can be provided a component for comparing the PN sequence from the respective PN lock circuit to the input data stream, to determine whether the input data stream and the PN sequence are synchronized; and providing an indication that the data is synchronized when the input data stream and the PN sequence are synchronized.

Figure 2:
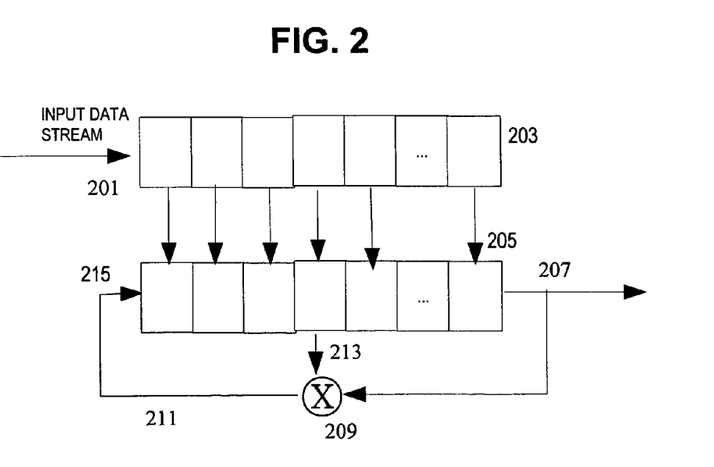
FIG. 2 is a block diagram illustrating an exemplary pseudorandom noise (PN) lock circuit, in accordance with one or more embodiments.

Referring now FIG. 2, a block diagram illustrating an exemplary pseudorandom noise (PN) lock circuit in accordance with one or more embodiments will be discussed and described. An input data stream 201 can be provided, as in the illustration. In the illustrated embodiment, the input data stream that is being provided initially includes or primarily consists of input PN sequence data. In accordance with known techniques, the input PN sequence data in the input data stream 201 can be repeatedly received, for example until the receiving device is initialized.

A, N-length portion of the input PN sequence data in the input data stream 201 can be stored into a register 203. For example, the first received N bits of the input PN sequence data can be stored in the register 203. N represents the size of the shift register used to generate the PN sequence. An example of a typical value for N is 17.

The contents of the register 203 can be loaded into a PN generation register 205, for example by copying bits from the register 203 into the PN generation register 205. In the illustrated embodiment, the PN generation register 205 is a register, for example a feedback shift register. The size of the registers illustrated here is representative of various sizes which can be utilized ranging from two bits or more.

The contents of the PN generation register 205, having been loaded, can then be utilized to generate a PN sequence 207. In the illustrated embodiment, the PN sequence 207 can be generated as follows. The contents of the PN generation register 205 can be shifted, as here where they are shifted right one bit. The least significant bit that was shifted out can provide the next bit in the PN sequence 207. The least significant bit that was shifted out can be XOR'd with the contents of a pre-defined bit 213 from the PN generation register 205. The result of the XOR can be inserted into the empty bit, here, the most significant bit 215. The foregoing operations can be performed in the same clock cycle.

The bits that are illustrated here as being used for these operations are illustrative of bits in any location in the registers. Also, it will be appreciated that a left shift or right shift can be performed.

The XOR and shift can be repeated as desired, thereby generating a PN sequence 207 bit-by-bit. A 7-bit PN generation register can yield a PN sequence that is $2^7-1$ bits long, that is, a 127-bit sequence that repeats. The PN sequence 207 can be continually generated. Loading of other data into the PN generation register 205 can result in a different PN sequence 207 being generated.

Accordingly, one or more embodiments can provide a PN lock circuit outputting a PN sequence responsive to the input data stream. The output PN sequence can be referred to as a "local PN sequence." Accordingly, one or more embodiments can provide that the PN lock component is responsive to a portion of bits in an input PN sequence in an input data stream, and outputs a local PN sequence.

Figure 3:
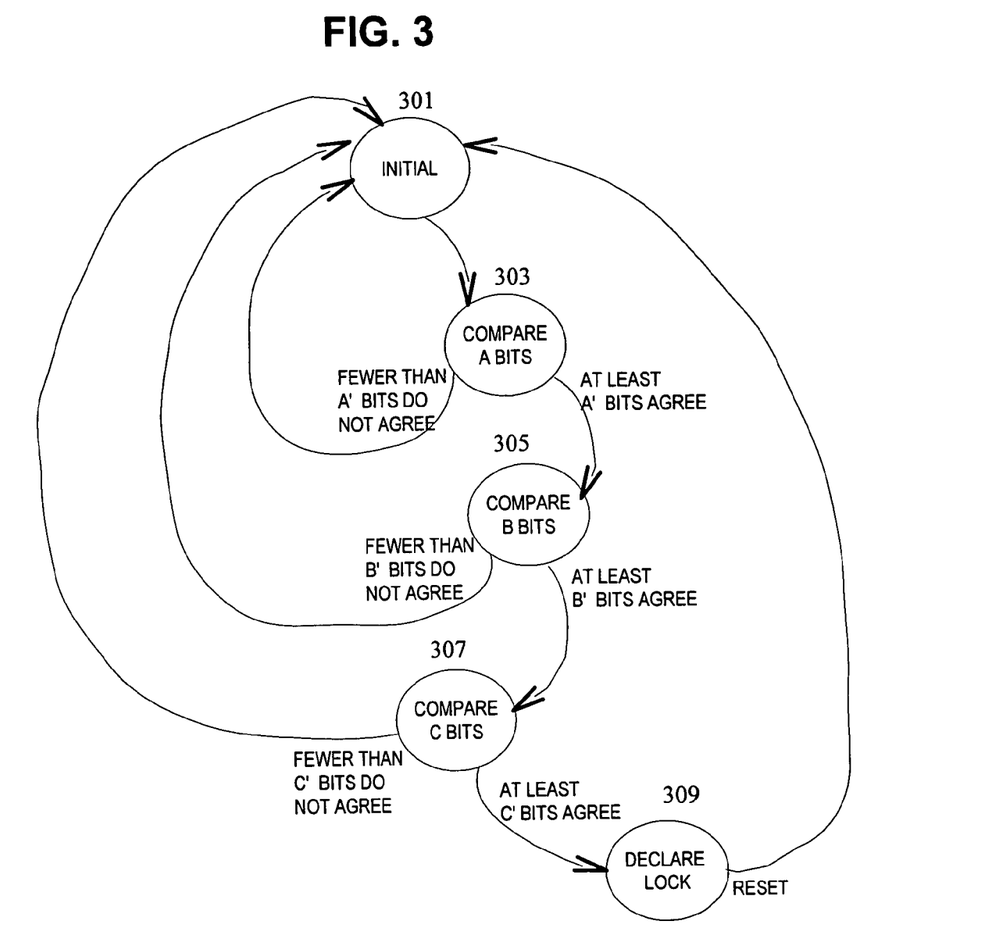
FIG. 3 is a state diagram illustrating a comparison for determining if the data is synchronized in accordance with one or more embodiments.

Referring now to FIG. 3, a state diagram illustrating a comparison for determining if the data is synchronized in accordance with one or more embodiments will be discussed and described. As in the illustrated embodiment, the comparison of portions of the input data and the PN sequence can be staged. Also, as in the illustrated embodiment, one or more embodiments can accommodate potentially noisy data, that is, data where there may be errors in bits. One or more embodiments can omit the staged comparison or the accommodation of noisy data.

The illustrated state diagram can include an initial state 301, a state for comparing A bits 303, a state for comparing B bits 305, a state for comparing C bits 307, and/or a declare lock state 309. The bits that are compared can be mutually exclusive, so that the same bit is not compared twice. In the states for comparing A, B, and C bits 303, 305, 307, a subset of the set of bits from the input data is compared to the PN sequence, as further explained below.

In the initial state 301, the PN sequence can be initialized or re-initialized from the input data. For example, the PN generation register can be seeded from one or more portions of the input data. When the PN sequence is available, for example in a register, the initial state 301 can change to the state for comparing A bits 303.

In the state for comparing A bits 303, a subset of the set of bits ("A bits") can be compared to the respective portion of the PN sequence. If the bits in the subset (A bits) do not agree, then the data is not synchronized and the state can be returned to the initial state 301. However, if the bits agree, then another subset of the set of bits can be compared. This way, a lack of agreement can be detected without the need to compare all bits.

In accordance with one or more embodiments, the bits in the subset (A bits) can be determined to be in sufficient agreement when at least a predetermined number of the bits in the subset (A' bits) are in agreement. This can accommodate a certain amount of bits that are in error due to noise, for example. For example, if nine bits in the subset are being compared for agreement, agreement between seven of the nine bits can be deemed to be acceptable. The subsequent states can also accommodate noise in the bits in a similar manner.

Similarly, in the state for comparing B bits 305, a second subset of the set of bits ("B bits") can be compared to the respective portion of the PN sequence. If the bits in the subset (B bits) do not agree, then the data is not synchronized and the state can be returned to the initial state 301. If the B bits do agree, or if at least a predetermined portion B' of the B bits agree, then the next subset of the set of bits can be compared. For example, if 12 bits in the subset are being compared for agreement, agreement between 10 bits can be acceptable.

An example state for comparing C bits 307 is the final state in the illustrated embodiment. In this state 307, a third subset of the set of bits ("C bits") can be compared to the respective portion of the PN sequence. If the bits in the subset (C bits) do not agree, then the data is not synchronized and the state can be returned to the initial state 301. If the C bits do agree, or if at least a predetermined portion C' of the C bits agree, then it is determined that the set of bits and the PN sequence agree; the declare lock state 309 can be entered.

In the declare lock state 309, an indication can be provided that the data is synchronized. The declare lock state 309 can be reset to the initial state 301, for example when a new frame is received or when a reset is otherwise forced.

In accordance with one or more embodiments, the subsets of the set of bits do not overlap. Accordingly, at least the first subset and the second subset can be mutually exclusive portions of the same input data stream. Where third and/or additional subsets are provided, all of the subsets can be mutually exclusive portions of the same input data stream. Moreover, one or more embodiments provide that the staged comparison can include performing successive comparisons of at least two subsets of mutually exclusive bits of the local PN sequence to the input data stream to determine agreement. In accordance with one or more embodiments, the overall combined subsets can be the same as the set of bits.

Accordingly, one or more embodiments can provide that the determining by the component for comparing the PN sequence includes staged determinations of whether mutually exclusive portions of the same input data stream and the PN sequence are synchronized.

In accordance with one or more embodiments, it can be determined that there is agreement when at least a majority of the input data stream and a majority of the local PN sequence under comparison agree. In accordance with one or more embodiments, the at least one comparison component determines that the bits in the first subset agree when X number of bits in the first subset are the same, and that the bits in the second subset agree when Y number of bits in the second subset are the same, where X and Y are each more than a majority of and less than or equal to the total number of bits being compared in the local PN sequence. Accordingly to one or more embodiments, the comparing of the second subset is performed only if the predetermined first portion of the bits in the first subset agrees with the input data stream.

Although the illustrated embodiment utilizes state changes to switch between the stages 301, 303, 305, 307, 309 in the staged comparison, it will be appreciated that stages in the staged comparison can be performed in parallel in one or more alternative embodiments.

The illustrated embodiment utilizes three states in which comparison can be performed. However, alternative embodiments may use fewer comparison states, or more comparison states.

One or more alternative embodiments can provide that where the comparisons accept agreement of fewer than all bits as being sufficient, the number of bits required for acceptance can be varied. For example, where 12 bits are compared and agreement between 10 is acceptable, these numbers can be adjusted in hardware and/or software.

Accordingly, one or more embodiments can provide that the component for comparing the PN sequence determines that the input data stream and the PN sequence are synchronized when X bits in the input data stream and the PN sequences are the same, where X is more than a majority and less than or equal to the total number of bits.

Figure 4:
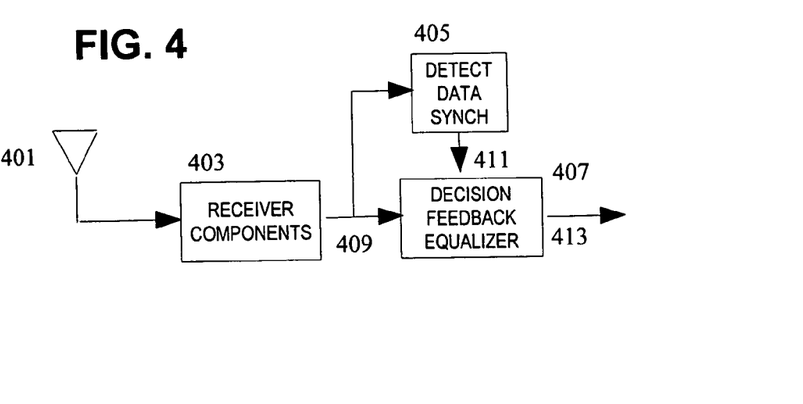
FIG. 4 is a block diagram illustrating an exemplary receiver arranged for utilizing data synchronization detection in accordance with one or more embodiments.

Referring now to FIG. 4, a block diagram illustrating an exemplary receiver arranged for utilizing data synchronization detection in accordance with one or more embodiments will be discussed and described. Here, the data synchronization detection is used in connection with a decision feedback equalizer (DFE).

The input data including the input PN sequence data can be received at a receiver 401, or a transceiver, in accordance with well known techniques. Various digital receiver components, generally represented by the receiver components 403, can perform various well known operations on the received data, including for example converting the input data from analog to digital.

The input data 409 can then be provided to the DFE 407 and to the data synchronization detection circuit 405. The data synchronization detection circuit 405 can provide an error free bit stream 411 from the local PN generator to the DFE 407 when the data is synchronized.

When the DFE 407 receives the indication that the data is synchronized, the DFE can begin training of an equalization block based on the input data 409 and the locally generated bit stream 411 in the conventional manner. Consequently, the time for training of the equalization block is reduced in comparison with traditional techniques.

Accordingly, one or more embodiments provide that the device for detecting data synchronization can be in a circuit configured to facilitate a decision feedback equalizer. One or more alternative embodiments also provide for similar use of the data synchronization detection circuit in connection with a rake, a linear equalizer, or the like.

Referring now to FIG. 5, a block diagram illustrating detection of data synchronization in accordance with various alternate exemplary embodiments will be discussed and described. In the exemplary embodiment of FIG. 5, two or more PN lock circuits are provided in parallel, sharing a compare component.

An input data stream 507, such as obtained from a received transmission in a data communication, can be provided. The illustrated embodiment of a data synchronization detection device can include 1st, 2nd and nth PN lock circuits 501, 511, 521. The PN lock circuits 501, 511, 521 can be provided in parallel. The PN lock circuits 501, 511, 521 can share a compare component 527. The illustrated PN lock circuits 501, 511, 521 can each include a register, here illustrated as 1st, 2nd and nth shift register 503, 513, 523, for generating PN sequences. In the illustrated embodiment, there are provided three PN lock circuits. Accordingly, one or more embodiments provide that three PN lock circuits share the compare component.

Different portions of the input data stream 507 can be provided to respective PN lock circuits 501, 511, 521. In the illustrated embodiment, the input data stream 507 can be time shifted by including a delay 509, 519.

Due to the delay 509, 519, the PN lock circuits 501, 511, 521 can receive different portions of input PN sequence data in the input data stream 507. The PN lock circuits 501, 511, 521 can then provide respective PN sequences in their corresponding registers 503, 513, 523.

The compare component 527 can compare the PN sequences in the alternating registers 503, 513, 523 to the input data stream 507. Once the input data stream 507 agrees with the PN sequence in at least one of the registers 503, 513, 523, the compare component 527 can signal 517 the detection of agreement. In accordance with one or more embodiments, a signal can also indicate which register 503, 513, 523 generates the PN sequence that resulted in agreement.

Referring now to FIG. 6, a block diagram illustrating detection of data synchronization in accordance with various other alternate exemplary embodiments will be discussed and described. In the exemplary embodiment of FIG. 6, one PN lock circuit 603 and one compare component 609 are provided.

The PN lock circuit 603 receives an input data stream 601. The PN lock circuit 603 can provide a PN sequence in a shift register 605. For example, the PN sequence in the shift register can be provided as discussed in detail above. The PN sequence 607 can be provided to the compare component 609.

The compare component 609 can compare the input data stream 601 to the PN sequence 607 provided by the PN lock circuit 603. In the illustrated embodiment, the compare component 609 can utilize a staged or parallel comparison, such as discussed in connection with FIG. 3. Accordingly, the compare component 609 can perform separate comparisons of subsets of different bits in the input data stream to the corresponding bits of the PN sequence. The comparison of subsets can be performed by progressing through states, or can be performed in parallel, as previously discussed.

When the input data stream 601 agrees with the PN sequence 607, the compare component 609 can signal 611 the detection of agreement.

Accordingly, one or more embodiments can provide for at least one pseudorandom noise (PN) lock component, responsive to a portion of bits in an input PN sequence in an input data stream, outputting a local PN sequence. There can also be provided at least one comparison component receiving the input data stream and comparing subsets of the local PN sequence to the same input data stream, including at least a first subset and a second subset; the comparing can include determining synchronization by whether at least a predetermined first portion of the bits in the first subset agree with the input data stream and at least a predetermined second portion of the bits in the second subset agree with the input data stream; and outputting an indication when the data is synchronized, responsive to the at least one comparison component.

Figure 7:
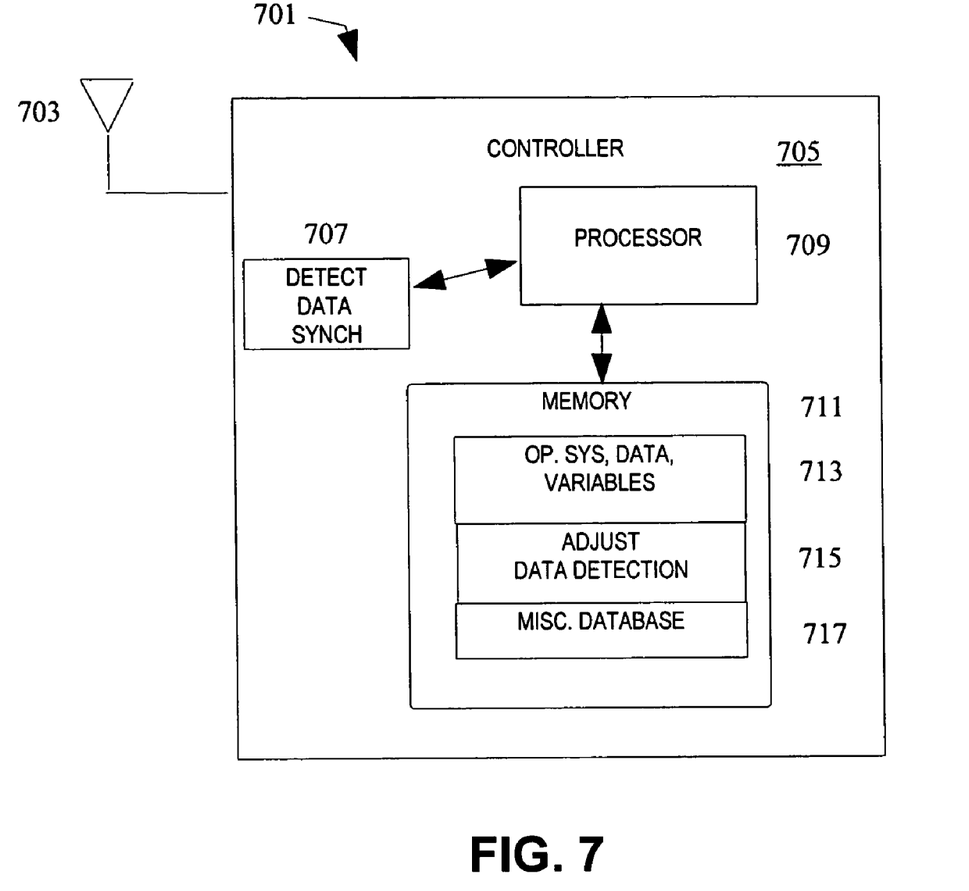
FIG. 7 is a block diagram illustrating portions of an exemplary communication unit with data synchronization detection, in accordance with various exemplary embodiments.

Referring now to FIG. 7, a block diagram illustrating portions of an exemplary communication unit with data synchronization detection in accordance with various exemplary embodiments will be discussed and described. The communication unit 701 may include a receiver 703 (or transceiver, not illustrated) a processor 709, and a memory 711.

The processor 709 may comprise one or more microprocessors and/or one or more digital signal processors. The memory 711 may be coupled to the processor 709 and may comprise a read-only memory (ROM), a random-access memory (RAM), a programmable ROM (PROM), and/or an electrically erasable read-only memory (EEPROM). The memory 711 may include multiple memory locations for storing, among other things, an operating system, data and variables 713 for programs executed by the processor 709; computer programs for causing the processor to operate in connection with various functions such as adjusting data detection 715, and/or other processing (not illustrated); and a database 717 for other information used by the processor 709. The computer programs may be stored, for example, in ROM or PROM and may direct the processor 709 in controlling the operation of the communication unit 701.

The processor 709 may be programmed to adjust the data synchronization detection 715. For example, the number of permitted bits having errors when determining data synchronization can be adjusted in one or more embodiments. Optionally, the processor 709 can be programmed to direct a data synchronization detection circuit 707 to adjust the number of permitted bits having errors. For example, the processor 709 can interact with the user via a user interface (not illustrated) to make the communication more robust, or to accommodate noisier or cleaner data communications. Also, the processor 709 can adjust the data detection responsive to a communication indicating the adjustment.

Responsive to receiving signals on the receiver 703, input data is processed in various well-known components which are not further illustrated. The input data received by the receiver 703 can also be provided to the data synchronization detection circuit 707, which operates on the input data as previously discussed.

One or more embodiments provide that the data synchronization circuit can be incorporated into a communication unit. The data communication unit can incorporate and/or be configured to operate in connection with a decision feedback equalizer, a rake, a line equalizer, or the like.

Figure 8:
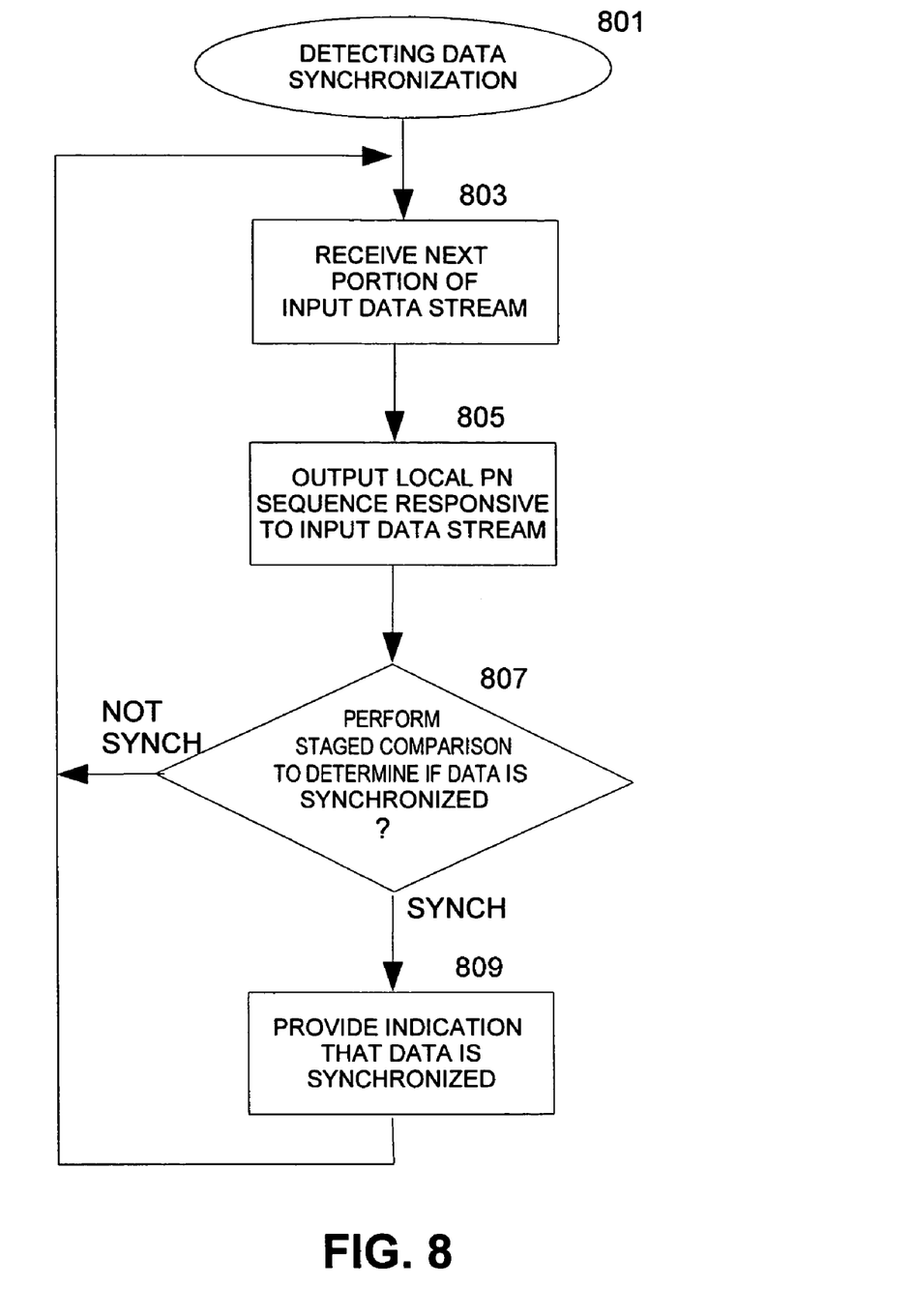
FIG. 8 is a flow chart illustrating an exemplary procedure for detecting data synchronization in accordance with various exemplary and alternative exemplary embodiments.

Referring now to FIG. 8, a flow chart illustrating an exemplary procedure for detecting data synchronization 801 in accordance with various exemplary and alternative exemplary embodiments will be discussed and described. The procedure can advantageously be implemented in, for example, a circuit described in connection with FIG. 1, 5 or 6 or other apparatus appropriately arranged.

In overview, the procedure for detecting data synchronization 801 can include receiving 803 a next portion of the input data stream, outputting 805 a local PN sequence responsive to the input data stream, performing 807 a staged comparison to determine if the data is synchronized, and providing 809 an indication when the data is synchronized.

The process of receiving 803 a next portion of the input data stream can include receiving the input data stream with the input PN sequence data, and storing a portion of the input PN sequence data for use in generating the local PN sequence.

The process of outputting 805 a local PN sequence responsive to the input data stream can include utilizing the input PN sequence data for generating the local PN sequence, and providing the local PN sequence for later use such as in a register or as a data stream.

The process of performing 807 a staged comparison to determine if the data is synchronized was discussed by way of example in detail in connection with FIG. 3. The local PN sequence can be compared to the input data to determine whether the data is synchronized. When the staged comparison determines that the data is not synchronized, the process can start over, for example with the next portion of the input data stream.

If the staged comparison determines that the data is synchronized, an indication can be provided 809 that the data is synchronized. The process can start over, for example with the next frame or next input data stream.

Accordingly, one or more embodiments provide a method for detecting data synchronization in a communication device. The method includes receiving, at a plurality of pseudorandom noise (PN) lock circuits, an input data stream, each of the PN lock circuits being time offset with respect to the other PN lock circuits, and each of the PN lock circuits outputting a local PN sequence responsive to the input data stream. The method also includes, for each of the PN lock circuits, performing a staged comparison of the local PN sequence from the respective PN lock circuit to the input data stream, to determine whether the input data stream and the local PN sequence are synchronized. The method also includes providing an indication that the data is synchronized when the input data stream and the local PN sequence are synchronized.

It should be noted that the term communication unit may be used interchangeably herein with subscriber unit, wireless subscriber unit, wireless subscriber device or the like. Each of these terms denotes a device ordinarily associated with a user and typically a wireless mobile device that may be used with a public network, for example in accordance with a service agreement, within an ad hoc network, or within a private network such as an enterprise network. Examples of such units include personal digital assistants, personal assignment pads, and personal computers equipped for wireless operation, a cellular handset or device, or equivalents thereof, devices utilizing receivers for wireless communication, devices communicating utilizing ultra wide band (UWB) protocols, and/or devices utilizing PN synchronization in connection with data communications. Accordingly, one or more embodiments provide that the device or method for detecting data synchronization in data communications can be configured for operation in accordance with a UWB protocol.

The communication systems and communication units of particular interest are those providing or facilitating voice communications services or data, multimedia or messaging services over cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5 G and 3 G systems such as UMTS (Universal Mobile Telecommunication Service) systems, Internet Protocol (IP) Wireless Wide Area Networks like 802.16, 802.20 or Flarion, integrated digital enhanced networks and variants or evolutions thereof.

Furthermore the wireless communication units or devices of interest may have short range wireless communications capability normally referred to as WLAN (wireless local area network) capabilities, such as IEEE 802.11, IEEE 802.15, Bluetooth, or Hiper-Lan and the like preferably using CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication units or devices of interest may be connected to a LAN using protocols such as TCP/IP, UDP/UP, IPX/SPX, or Net BIOS via a hardwired interface such as a cable and/or a connector. In particular, wireless communication systems that employ ultra wide band (UWB) technologies are of particular interest.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A device for detecting data synchronization in data communications comprising:
   a plurality of pseudorandom noise (PN) lock circuits, each of the PN lock circuits receiving an input data stream, each of the PN lock circuits being time offset with respect to the other PN lock circuits, and each of the PN lock circuits outputting a PN sequence responsive to the input data stream;
   for each PN lock circuit, a component for comparing the PN sequence from the respective PN lock circuit to the input data stream, to determine whether the input data stream and the PN sequence are synchronized; and providing an indication that the data is synchronized when the input data stream and the PN sequence are synchronized.

2. The device of claim 1, wherein the plurality of PN lock circuits operate in parallel on time offset portions of the same input data stream, and the respective components operate on respective time offset portions of the same input data stream.

3. The device of claim 1, wherein there are provided three PN lock circuits.

4. The device of claim 1, wherein the time offset corresponds to N/2, wherein the PN sequence is output by the respective PN lock circuit into a shift register, and where N is number of bits of the shift register.

5. The device of claim 1, wherein the determining by the component for comparing the PN sequence includes staged determinations of whether mutually exclusive portions of the same input data stream and the PN sequence are synchronized.

6. The device of claim 1, wherein the component for comparing the PN sequence determines that the input data stream and the PN sequence are synchronized when X bits in the input data stream and the PN sequence are the same, where X is more than a majority and less than or equal to the total number of bits.

7. The device of claim 1, wherein the device for detecting data synchronization is in a circuit connected to a decision feedback equalizer.

8. A device for detecting data synchronization in data communications comprising:
   at least one pseudorandom noise (PN) lock component, responsive to a portion of bits in an input PN sequence in an input data stream, outputting a local PN sequence;
   at least one comparison component receiving the input data stream and comparing subsets of the local PN sequence to the same input data stream, including at least a first subset and a second subset; the comparing including determining synchronization by whether a predetermined first portion of the bits in the first subset agree with the input data stream and a predetermined second portion of the bits in the second subset agree with the input data stream; and outputting an indication when the data is synchronized, responsive to the at least one comparison component.

9. The device of claim 8, wherein three PN lock components are provided.

10. The device of claim 8, wherein the first subset and the second subset are mutually exclusive portions of the same input data stream.

11. The device of claim 8, wherein the at least one comparison component determines that the bits in the first subset agree when X number of bits in the first subset are the same, and that the bits in the second subset agree when Y number of bits in the second subset are the same, where X and Y each are more than a majority of and less than or equal to the total number of bits being compared in the local PN sequence.

12. The device of claim 8, wherein the device for detecting data synchronization is in a circuit connected to a decision feedback equalizer.

13. The device of claim 8, wherein the first subset and the second subset are mutually exclusive portions of the same input data stream.

14. The device of claim 8, wherein the at least one comparison component determines that the bits in the first or second subset agree when X number of bits in the first or second subset are the same, where X is more than a majority of and less than or equal to the total number of bits being compared in the local PN sequence.

15. The device of claim 8, wherein the device for detecting data synchronization is in a circuit connected to a decision feedback equalizer.

16. A method for detecting data synchronization in a communication device, comprising:
   receiving, at a plurality of pseudorandom noise (PN) lock circuits, an input data stream, each of the PN lock circuits being time offset with respect to the other PN lock circuits, and each of the PN lock circuits outputting a local PN sequence responsive to the input data stream;
   for each of the PN lock circuits, performing a staged comparison of the local PN sequence from the respective PN lock circuit to the input data stream, to determine whether the input data stream and the local PN sequence are synchronized; and
   providing an indication that the data is synchronized when the input data stream and the local PN sequence are synchronized.

17. The method of claim 16, wherein the staged comparison includes performing successive comparisons of at least two subsets of mutually exclusive bits of the local PN sequence to the input data stream to determine agreement.

18. The method of claim 17, wherein there is agreement when at least a majority of the input data stream and a majority of the local PN sequence under comparison agree.

19. The method of claim 16, wherein the input data stream and the local PN sequence are determined to be synchronized when at least a majority of the input data stream and a majority of the local PN sequence agree.

* * * * *